(12) United States Patent
Aikawa et al.

(10) Patent No.: US 6,690,549 B1
(45) Date of Patent: Feb. 10, 2004

(54) STORAGE DEVICE

(75) Inventors: Koichi Aikawa, Kawasaki (JP); Tatsuro Sasamoto, Kawasaki (JP); Susumu Yoshida, Kawasaki (JP); Akihide Jinzenji, Kawasaki (JP); Tomoo Sukagawa, Kawasaki (JP); Keiji Aruga, Kawasaki (JP); Yoshiaki Koizumi, Kawasaki (JP); Yasuyoshi Asao, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/501,470

(22) Filed: Feb. 9, 2000

(30) Foreign Application Priority Data

Jul. 29, 1999 (JP) .......................... 11-215758

(51) Int. Cl.[7] ............................. G11B 21/08
(52) U.S. Cl. ................................. 360/264.4
(58) Field of Search .................... 360/264.4, 264.7, 360/264.8, 264.9, 265, 245.9, 246.7, 264.2

(56) References Cited

U.S. PATENT DOCUMENTS

| | | | | | |
|---|---|---|---|---|---|
| 4,544,972 A | * | 10/1985 | Kogure et al. | ........... | 360/264.4 |
| 4,967,293 A | * | 10/1990 | Aruga et al. | ......... | 360/246.7 X |
| 5,761,007 A | * | 6/1998 | Price et al. | ............... | 360/264.4 |
| 5,805,386 A | * | 9/1998 | Faris | ........................ | 360/264.4 |
| 5,983,485 A | * | 11/1999 | Misso | ..................... | 29/603.03 |
| 6,121,742 A | * | 9/2000 | Misso | ..................... | 360/75 X |

FOREIGN PATENT DOCUMENTS

| JP | 5823362 | 2/1983 |
|---|---|---|
| JP | 6278783 | 4/1987 |

\* cited by examiner

*Primary Examiner*—David Hudspeth
*Assistant Examiner*—Mitchell Slavitt
(74) *Attorney, Agent, or Firm*—Greer, Burns & Crain, Ltd.

(57) ABSTRACT

A magnetic disk unit has two actuators each rotating on a common rotary shaft. The two actuators are driven by a voice coil motor. The voice coil motor comprises: a magnetic circuit comprising a magnet provided for the two actuators on a common basis and two yokes, which are associated with the two actuators, respectively, said two yokes being disposed at both sides between which the magnet intervenes; and two coils provided for the two actuators, respectively.

8 Claims, 15 Drawing Sheets

STORAGE DEVICE

BACKGROUND OF THE INVENTION

1. Field of the Invention

The present invention relates to a storage device having a rotation driving unit for rotating a plurality of disk type of storage media each loaded on a coaxial basis on a center shaft, and a plurality of actuators for moving a head for picking up information from the storage media along the storage media in a radial direction of the storage media.

2. Description of the Related Art

As the storage device as mentioned above, there are known a magnetic disk unit and an optical disk unit. Here there will be described the magnetic disk unit by way of example.

Hitherto, according to the conventional magnetic disk unit, in many cases, a spindle motor (including a magnetic disk medium) is associated with an actuator on a one-to-one basis. Further, there is also known a magnetic disk unit in which a plurality of actuators are associated with one spindle motor to store or read a large volume of information into or from a medium, so that a processing speed of one magnetic disk unit is improved. However, according to such a type of magnetic disk unit as mentioned above, a plurality of actuators are disposed around the spindle motor. This arrangement needs a large occupation for the actuators and magnetic circuits and thus invites a larger device. Furthermore, there is considered an arrangement in which a plurality of actuators are rotatably moved on a coaxial basis (cf. for example, Japanese Patent Application Laid Open Gazette Sho. 58-23362, and Japanese Patent Application Laid Open Gazette Sho. 62-78783). However, according to such an arrangement, a plurality of actuators are simply superposed on a single rotary shaft, or there is provided a sub-base for integrating the actuators with the magnetic circuits. This is associated with a problem that it is difficult to provide a compactness of the device, and particularly very difficult to provide, for example, 3.5 inch disk factor (146 by 101.6 by 25.4 millimeters). According to the technologies proposed in the above-referenced documents, it is obliged to provide a large structure for the magnetic circuit. This involves an increment of the cost of the magnetic disk unit. Thus, it has to say that the technologies proposed in the above-referenced documents are for an especial device, but not for the general devices. Particularly, according to the magnetic disk unit in which actuators are laminated, there is a tendency that a frequency characteristic for enhancing a dynamic positioning performance of the actuators is degraded. Further, it often happens that a performance of moving and stopping a head for reading and writing information at a proper position is also degraded owing to a thermal distortion, a failure of accuracy in a size of a height direction, and the like.

Further, the above-mentioned magnetic disk unit having a plurality of actuators is associated with the following problems.

FIG. 1 is a schematic diagram of the conventional magnetic disk unit.

A magnetic disk 10 rotates on a center shaft 11 in a direction of an arrow A by a spindle motor (not illustrated).

The magnetic disk unit is provided with two actuators 20. Each of the actuators 20 rotates on a rotary shaft 21 so that a magnetic head 30 provided on the top of the actuator 20 is moved in a radial direction of the magnetic disk 10 along the magnetic disk 10. Each of the magnetic heads 30 records on the magnetic disk 10 information according to a signal transmitted from an associated signal recording/regenerating means 40, or picks up information recorded on the magnetic disk 10 and transmits the same to the associated signal recording/regenerating means 40.

The magnetic disk 10 stores therein information as to usual data to be read or written and in addition information as to a servo for a position control of the magnetic head 30 to the magnetic disk 10. The magnetic head 30 picks up from the magnetic disk 10 a signal representative of information recorded on the magnetic disk 10. Each of the signal recording/regenerating means 40 regenerates both the signals as to the data and the servo, which are picked up by the head 30 of the top of the associated actuator 20, and transmits the same to a associated signal processing means 50. Each of the signal processing means 50 processes the signals regenerated by the signal recording/regenerating means 40, and instructs an associated position control means 60 to perform a position control for the associated actuator 20 in accordance with a processing result of the servo signal. Each of the position control means 60 controls the operation of the associated actuator 20 in accordance with the instruction from the associated signal processing means 50 so that the head 30 of the top of the associated actuator 20 moves to a desired position onto the magnetic disk 10.

According to the magnetic disk unit shown in FIG. 1, each of the actuator 20 is provided with the magnetic heads 30 the number of which is the same as that of the recording surfaces of the magnetic disk 10 (when only one magnetic disk 10 is concerned, two surfaces of the front and the back, and when two magnetic disks 10 are concerned, four surfaces), wherein each of the magnetic heads 30 is placed against the associated recording surface. Thus, it is possible to simultaneously access the same recording surface of the magnetic disk 10 with total two magnetic heads 30 of the two actuator 20.

FIG. 2 is a schematic diagram of an alternative conventional magnetic disk unit.

According to this magnetic disk unit, two actuators 20 are disposed in such a state that the two actuators 20 are laminated in a perpendicular direction with respect to the surface of the magnetic disk 10. The two actuators 20 may rotate independently on the same rotary shaft 21. In case of the magnetic disk unit, the total number of the magnetic heads 30 is the same as that of recording surfaces of the magnetic disk 10 (when two magnetic disks 10 are disposed on a laminating basis, four recording surfaces, and when three magnetic disks 10 are concerned, six surfaces), and a plurality of magnetic heads 30 (here two heads) are loaded on a plurality of actuators 20 (here two heads), respectively. Accordingly, it is possible to access a recording surface of the magnetic disk 10 with the associated one magnetic head 30. On the other hand, according to this magnetic disk unit, since there are plurality of actuators, it is possible to enhance a degree of freedom in such a manner that while a magnetic disk 10 is accessed with one of the actuators, another actuator is moved for the purpose of the successive access, and thereby increasing an access speed.

In this manner, the scheme of providing a plurality of actuators makes it possible to increase an access speed. However, as shown in FIGS. 1 and 2, this scheme needs a plurality of systems of circuits for the signal processing and the servo control, so that a scale of the circuits is obliged to be enlarged and complicated. Thus, this scheme is associated with problems that it is disadvantageous in size, and the cost will be increased, too.

Those problems may be common to a storage device for the optical disk unit and the photomagnetic disk unit, but not restricted to the magnetic disk unit. Further, those problems may be common to a device for loading a read/write medium and also a device for loading a read-only medium.

SUMMARY OF THE INVENTION

In view of the foregoing, it is an object of the present invention to provide a storage device having a plurality of actuators, which has a structure suitable for a miniaturization.

To achieve the above-mentioned objects, the present invention provides a first storage device comprising:

a rotation driving unit for rotating a disk type of storage medium loaded on a center shaft;

two actuators each having a head for picking up information from the storage medium, each of said two actuators rotating on a common rotary shaft and moving the associated head along the storage medium in a radial direction of the storage medium; and a voice coil motor for rotating said two actuators on the rotary shaft, wherein said voice coil motor comprises:

a first magnet provided for said two actuators on a common basis; and two coils provided for said two actuators, respectively, and wherein said voice coil motor rotates said two actuators on the common rotary shaft independently of one another.

According to the first storage device of the present invention as mentioned above, the first magnet is provided for the two actuators on a common basis. This feature makes it possible to use only one a magnetic circuit for driving the two actuators and also to drive the two actuators independently of one another by the single magnetic circuit. Thus, according to the first storage device of the present invention as mentioned above, the number of magnets and yokes can be reduced, too and thereby contributing to a miniaturization of the storage device despite the provision of a plurality of actuators.

In the first storage device of the present invention as mentioned above, it is preferable that said first storage further comprises two yokes, which are associated with said two actuators, respectively, said two yokes being disposed at both sides between which said first magnet intervenes.

Further, in the first storage device of the present invention as mentioned above, it is preferable that said two coils are disposed at both sides between which said first magnet intervenes.

Further, in the first storage device of the present invention as mentioned above, it is preferable that said rotation driving unit rotates a plurality of disk type of storage media each loaded on a coaxial basis on the center shaft, and as the plurality of disk type of storage media, an odd number of pieces of storage media each storing information on both front and back is loaded, and as said two actuators, an even number of pieces of heads for picking up information stored in both surfaces of front and back of the storage medium on a sharing basis for each surface is disposed on said two actuators in such a manner that said even number of pieces of heads are divided into two equal parts on said two actuators.

This feature makes it possible that the two actuators have the same weight and the same inertia, and it is possible to drive the actuators by the same driving force using the same control constant and thereby providing a device structure excellent in balance.

Further, in the first storage device of the present invention as mentioned above, it is preferable that said voice coil motor has two second magnets disposed at positions adjacent to said two yokes between the respective said two yokes and said first magnet, respectively.

While the use of the second magnet may increase the number of parts, it is possible to suppress the eddy-current which will be generated on the associated yoke, and thus it is possible to reduce the time constant of a coil for supplying a driving force to each actuator, and thereby permitting a high speed operation.

Furthermore, in the first storage device of the present invention as mentioned above, it is preferable that said storage device further comprises a stopper for limiting a rotary range of said two actuators. The use of the stopper may prevent the actuators from being damaged or malfunctioning.

Here, while it is acceptable that the stopper is arranged separately from the first magnet and the two yokes, it is preferable that said stopper is formed together with said first magnet and said two yokes into a module in one united body.

Still further, in the first storage device of the present invention as mentioned above, it is preferable that said storage device further comprises a flexible substrate for transmitting signals picked up by the heads of said two actuators, said flexible substrate being common to all the heads.

According to the first storage device of the present invention as mentioned above, the two actuators have the common rotary shaft. This feature permits to use only one flexible substrate for transmitting signals picked up by the heads of said two actuators. Thus, this is advantageous in cost as compared with a case where individual wiring is performed on each actuator.

To achieve the above-mentioned objects, the present invention provides a second storage device comprising:

a rotation driving unit for rotating a disk type of storage medium loaded on a common center shaft, said storage medium being adapted for storing information as to both data and servo;

a plurality of laminated type of actuators each having a head for picking up signals representative of information stored in the storage medium, each of said plurality of laminated type of actuators operating in a predetermined operating direction so that the associated head is moved along the storage medium in a radial direction of the storage medium, said plurality of laminated type of actuators operating independently of one another;

a plurality of signal regenerating units each corresponding to an associated one of said plurality of actuators for regenerating signals of both the data and the servo picked up by the head of the associated actuator;

a position control unit provided for said plurality of actuators on a common basis for controlling positions of said plurality of actuators independently of one another; and a signal processing unit provided for said plurality of actuators on a common basis for processing signals regenerated by said plurality of signal regenerating units and instructing said position control unit to control positions of said plurality of actuators in accordance with a processing result of a servo signal.

Each of the actuators performs not only picking up signals but also a plurality of processes, for example, a process for moving a head to a desired position on a storage medium, and a process for changeover of a head, which is to be operative to pick up signals, in the event that one actuator is provided with a plurality of heads. Therefore, it is possible to share the operation in such a manner that while a certain actuator picks up a signal, another actuator moves for the purpose of picking up the subsequent signal.

The second storage device of the present invention has been made taking the above-mentioned matter into account. In the second storage device, one signal processing unit (corresponding to signal processing means 50 in FIGS. 1 and 2) is provided for a plurality of actuators, and one position control unit (corresponding to position control means 60 in FIGS. 1 and 2) is provided to perform a position control for the plurality of actuators.

This feature makes it possible to simplify a circuit structure without substantially lowering the access speed of the storage device as compared with that of the conventional storage device shown in FIG. 2. Thus according to the second storage device of the present invention, it is advantageous in space and cost.

To achieve the above-mentioned objects, the present invention provides a third storage device comprising:

a rotation driving unit for rotating a disk type of storage medium loaded on a common center shaft, said storage medium being adapted for storing information as to both data and servo;

two laminated type of actuators each having a head for picking up signals representative of information stored in the storage medium, each of said two of laminated type of actuators operating in a predetermined operating direction so that the associated head is moved along the storage medium in a radial direction of the storage medium, said two laminated type of actuators operating independently of one another;

a data signal regenerating unit provided for said two actuators on a common basis for regenerating signals of data picked up by the heads of said two actuators;

a servo signal regenerating unit provided for said two actuators on a common basis for regenerating signals of servo picked up by the heads of said two actuators;

a signal selection unit provided for said two actuators on a common basis for assigning the signals of the data and the servo to the data signal regenerating unit and the servo signal regenerating unit, respectively;

a position control unit provided for said two actuators on a common basis for controlling positions of said two actuators independently of one another; and a signal processing unit provided for said two actuators on a common basis for processing signals regenerated by said data signal regenerating unit and signals regenerated by said servo signal regenerating unit and instructing said position control unit to control positions of said two actuators in accordance with a processing result of a servo signal.

The third storage device of the present invention has been made on the basis of the similar concept to the second storage device, too. According to the third storage device, there is provided two actuators, and the structure corresponding to the signal processing unit of the second storage device is divided into the data signal regenerating unit for regenerating signals of data, and the servo signal regenerating unit for regenerating signals of servo, and further there is provided the signal selection unit. Avoiding generation of timing of simultaneously picking up data signals by the heads of the two actuators makes it possible to simultaneously perform a regeneration of the data signal by one of the two actuators and a servo of another actuator. Further, according to the third storage device of the present invention, it is possible to reduce the circuit scale.

Furthermore, according to the third storage device of the present invention, in a similar fashion to that of the second storage device, the signal processing unit and the position control unit are provided for the two actuators on a common basis. Therefore, according to the third storage device of the present invention, it is possible to further reduce the circuit scale, as compared with the second storage device, and thus it is advantageous in space and cost.

In the second and third storage devices as mentioned above, it is preferable that said rotation driving unit rotates a plurality of disk type of storage media each loaded on a coaxial basis on the center shaft, and as to each of the plurality of disk type of storage media, servo sectors storing servo information are arranged at positions varied with respect to a circumferential direction of an associated storage medium in accordance with said plurality of actuators.

This feature makes it possible to differentiate timings for picking up of servo signals by the respective actuators, and thereby performing the position control for the actuators in mutually different timings.

Further, in the second and third storage devices as mentioned above, it is preferable that in order to simultaneously perform a data pick up by one head of one actuator and a preparation for a subsequent data pick up by another actuator, data sectors of the plurality of storage media are alternately arranged on storage areas shared by the plurality of actuators, or alternatively the data sectors are circularly arranged.

This feature makes it possible, when one head of a certain one actuator (referred to as a first actuator) picks up the data signal, to move another actuator (referred to a second actuator) for the purpose of picking up the subsequent data signal, and further makes it possible, in the that the second actuator is provided with a plurality of heads, to perform a changeover for picking up of the data signal between the heads. Thus, according to the second and third storage devices as mentioned above, it is possible to implement a higher speed of access.

Further, in the second and third storage devices as mentioned above, it is preferable that said signal processing unit stores a plurality of commands to indicate positions of the plurality of actuators and has on each actuator a command queue to perform reordering of the commands as a need arises.

An adoption of the command queue on each actuator makes it possible to perform an optimum ordering of the command on each actuator, and thereby contributing to an improvement of the access speed.

DETAILED DESCRIPTION OF PREFERRED EMBODIMENTS

Hereinafter, there will be described a storage device according to embodiments of the present invention.

Figure 3:
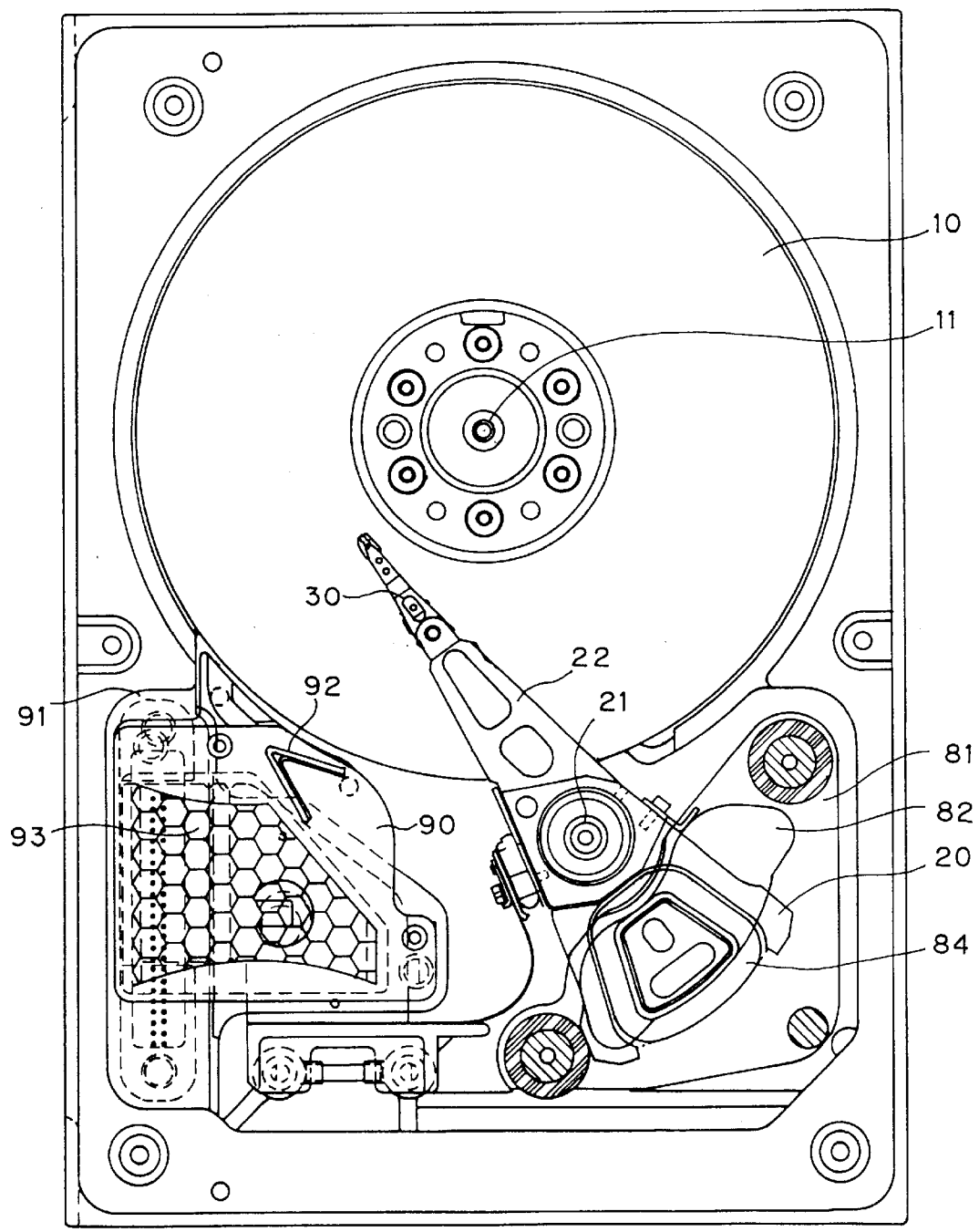
FIG. 3 is a plan view of a magnetic disk unit according to a first embodiment of a storage device of the present invention, wherein a cover is removed partially.
Figure 4:
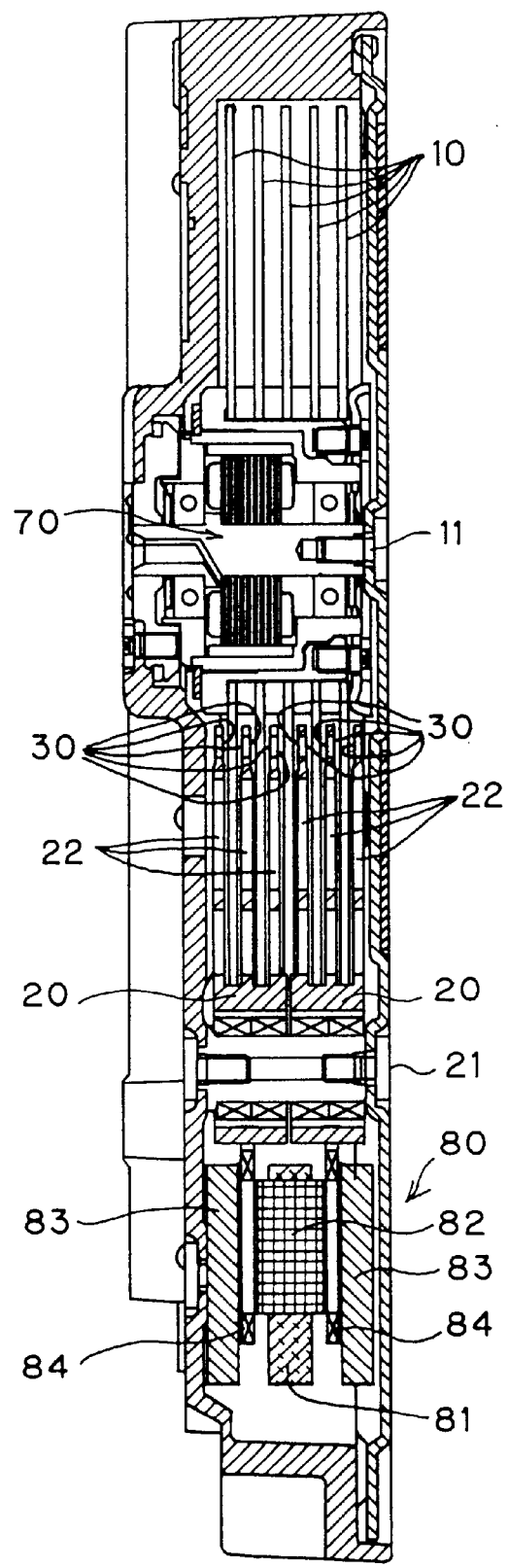
FIG. 4 is a sectional side elevation of the magnetic disk unit according to the first embodiment.

FIG. 3 is a plan view of a magnetic disk unit according to a first embodiment of a storage device of the present invention, wherein a cover is removed partially. FIG. 4 is a sectional side elevation of the magnetic disk unit according to the first embodiment.

According to the magnetic disk unit of the first embodiment, as shown in FIG. 4, a plurality of magnetic disks 10 (here five disks) are loaded on a coaxial basis. The five magnetic disks 10 are simultaneously rotated on a center shaft 11 by a spindle motor 70.

The magnetic disk unit is provided with two actuators 20 which rotate on a common rotary shaft 21. Each of the actuators 20 has three arms 22. Each of the arms 22 has on the top a magnetic head associated with information recording for picking up signals on an information recording surface (a front surface or a back surface) of the magnetic disk 10 on a share basis.

Total six arms of the two actuators 20 are disposed on an alternate basis with the five magnetic disks 10, as shown in FIG. 4. The information recording surface facing against the respective magnetic heads 30 is accessed by the magnetic heads 30 which are provided on the arms 22, respectively.

The two actuators 20 rotate independently on the rotary shaft 21 by a voice coil motor 80. The voice coil motor 80 is provided with a magnet 82 (a first magnet referred to in the present invention) fixed on a center block 81 in the center, and total two yokes 83, which correspond to the two actuators 20, respectively, in the both sides of the magnet 82. The voice coil motor 80 is provided with total two coils 84, which are disposed on the two actuators 20, respectively. When direction and magnitude of the currents conducting through the coils 84 are controlled independently, the two actuators 20 independently rotate on the common rotary shaft 21. According to the present embodiment, an odd number (here five pieces) of the magnetic disks 10 are loaded onto the magnetic disk unit, and an even number of (here ten pieces) of the magnetic heads 30 for accessing those odd number of magnetic disks 10 are disposed on the two actuators 20 in such a manner that the magnetic heads 30 are divided into two equal parts on the two actuators 20 (five pieces each). Specifically, of six arms 22, two arms disposed at both sides each face against only one information recording surface. Accordingly, only one associated magnetic head is provided for each arm. With respect to the remaining four arms, each of those arms faces two information recording surfaces. Accordingly, two associated magnetic heads are provided for each arm. In this case, the two actuators may be provided by the same structure. Thus, the two actuators have the same weight and the same inertia, and it is possible to drive the actuators by the same driving force using the same control constant.

As shown in FIG. 3, the center block 81, the magnet 82 and the two yokes 83 are formed into a module in one united body by two first studs 85 and one second stud 86. The two first studs 85 also serve as a stopper wherein when the two actuators 20 are going to rotate exceeding a predetermined rotary limit, the actuators 20 are prevented from being rotated.

The magnetic disk unit is further provided with, as shown in FIG. 3, a flexible substrate 90 connected to a connector 91 for supplying a current controlled by the coils 84 of the two actuators 20, sending a writing signal to a magnetic head 30 of the two actuators 20, and transmitting a signal picked up by the magnetic head 30 to a circuit system (not illustrated); a filter 92 for removing dust in air within the magnetic disk unit through utilizing a flow of air generated by a rotation of the magnetic disk 10; and a dehumidifying agent for keeping a dry state of the magnetic disk unit.

Figure 1:
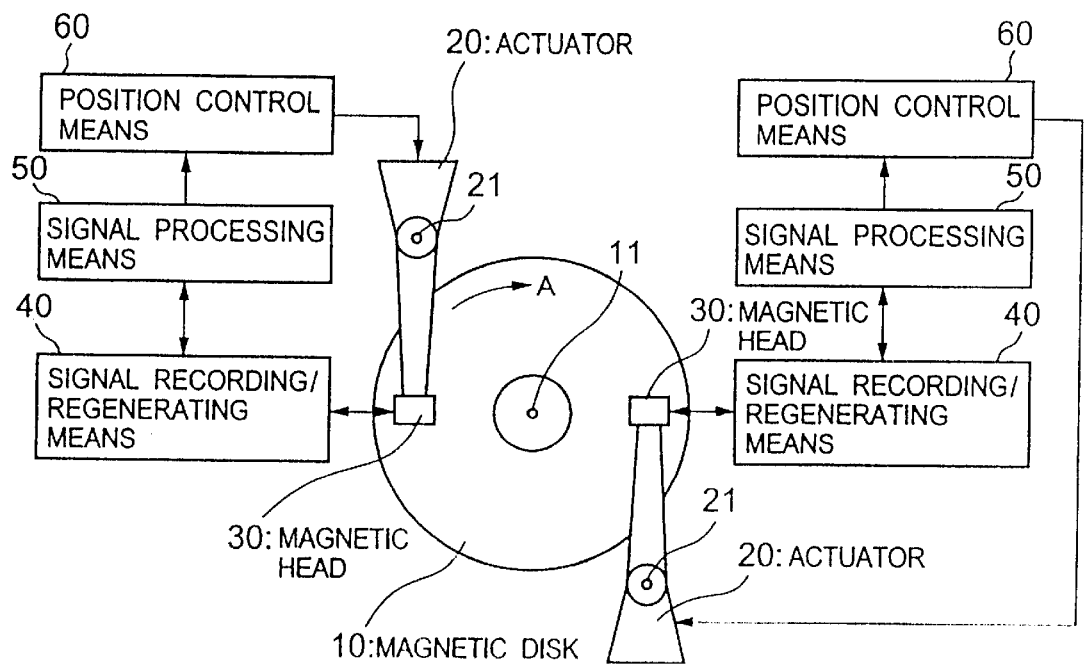
FIG. 1 is a schematic diagram of the conventional magnetic disk unit.
Figure 5:
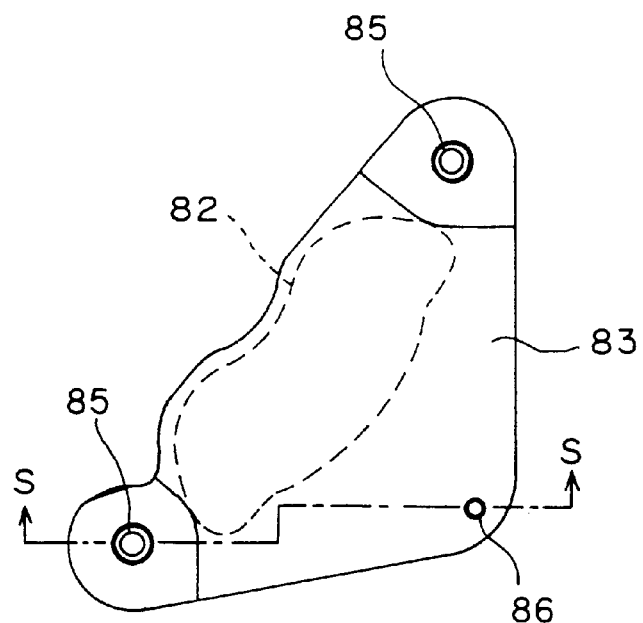
FIG. 5 is a view of a magnetic circuit in the magnetic disk unit shown in FIG. 1.
Figure 6:
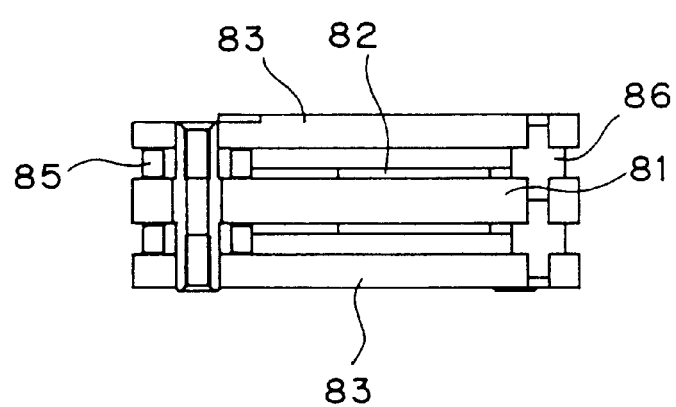
FIG. 6 is a view of a magnetic circuit in the magnetic disk unit shown in FIG. 1.
Figure 7:
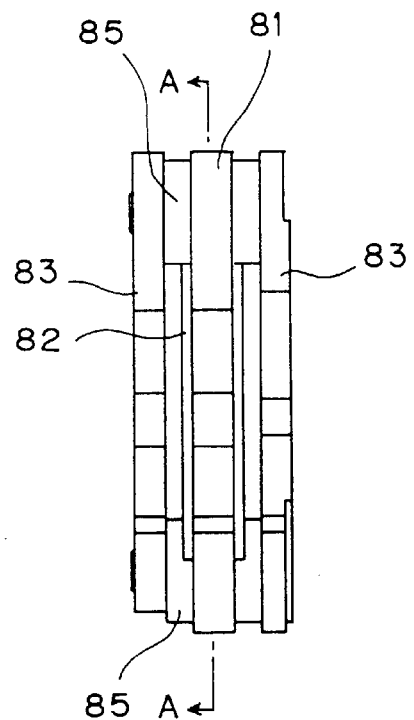
FIG. 7 is a view of a magnetic circuit in the magnetic disk unit shown in FIG. 1.
Figure 8:
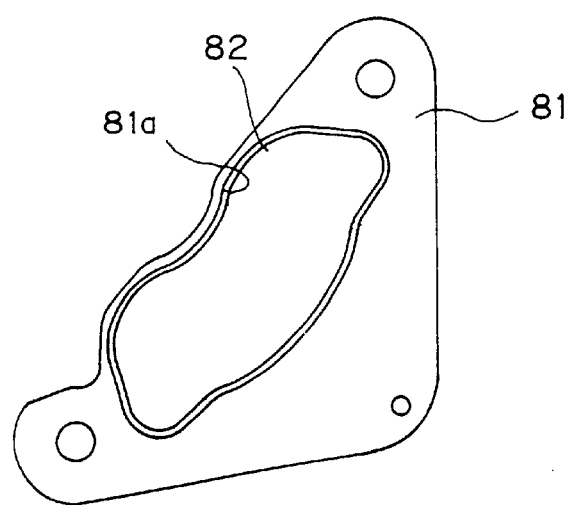
FIG. 8 is a view of a magnetic circuit in the magnetic disk unit shown in FIG. 1.

FIGS. 5 to 8 are views each showing a magnetic circuit in the magnetic disk unit shown in FIG. 1, in which the magnet and the yokes are formed into a module in one united body. FIG. 5 is a plan view. FIG. 6 is a sectional view taken along the line S—S of FIG. 4. FIG. 7 is a side elevation. FIG. 8 is a sectional view taken along the line A—A of FIG. 7.

As shown in FIG. 8, on the center of the center block (here non-magnetic metal) 81, there is provided a hole 81a penetrating through the front and the back of the center block 81. The magnet 82 is set into the hole 81a and is fixed on the hole 81a by an adhesive. Also as shown in FIGS. 6 and 7, the two yokes 83 are disposed while the magnet 82 intervenes therebetween. The center block 81 having the magnet 82 and the two yokes 83 are formed into a module in one united body by the first two studs 85 and the second stud 86. Those studs 85 and 86 are fixed by a press fitting or an adhesive. This magnetic circuit module is fixed at the position shown in FIG. 3 on a screw basis. Here, the two first studs 85 serve as a stopper for limiting a rotary range of the two actuators 20, as mentioned above.

Figure 9:
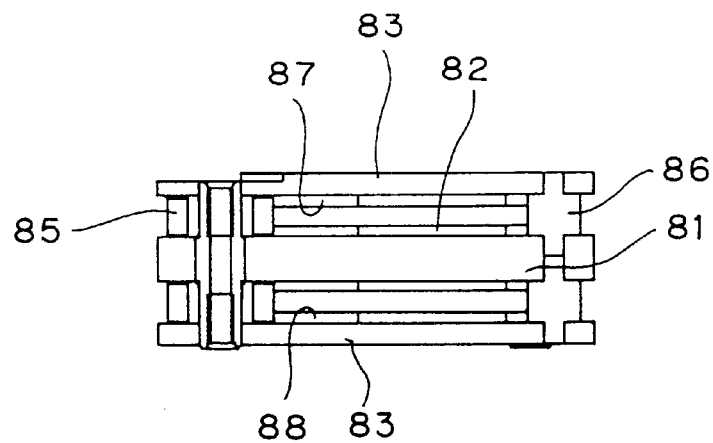
FIG. 9 is a view of an alternative magnetic circuit by which the magnetic circuit shown in FIGS. 5–8 may be replaced.
Figure 10:
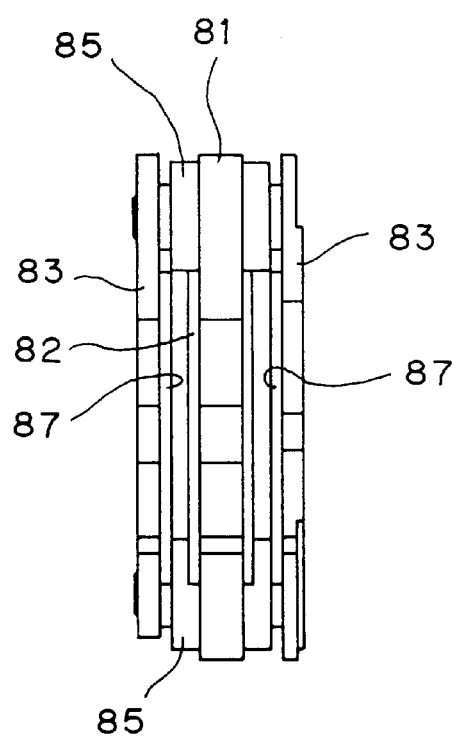
FIG. 10 is a view of an alternative magnetic circuit by which the magnetic circuit shown in FIGS. 5–8 may be replaced.

FIGS. 9 and 10 are views each showing an alternative magnetic circuit by which the magnetic circuit shown in FIGS. 5–8 may be replaced. Here, there are shown two views corresponding to FIGS. 6 and 7 in the magnetic circuit shown in FIGS. 5 to 8.

A difference between the magnetic circuit shown in FIGS. 9 and 10 and the magnetic circuit shown in FIGS. 5 to 8 resides in a point that total two magnets 87 (second magnets referred to in the present invention) are disposed at positions adjacent to the two yokes 83 between the respective two yokes 83 and the central magnet 82, respectively.

In the event that a coil for transmitting a driving force to an actuator in a gap between a magnet and a yoke in a magnetic circuit, the movement of the coil may generate an eddy-current loss on a yoke surface. An enlargement of the eddy-current loss may bring about an enlargement of an electric time constant and thus have an effect on a control of the actuator. In view of this, as shown in FIGS. 9 and 10, the magnet 87 is disposed at the yoke side, too. A provision of this magnet 87 at the yoke side makes it possible to prevent the eddy-current loss, and thus it is possible for the actuator to perform a position control excellent in responsibility.

In the event that the magnetic circuit module shown in FIGS. 5 to 8 or the magnetic circuit module shown in FIGS. 9 to 10 is incorporated into the magnetic disk unit shown in FIGS. 3 and 4, there is provided for the purpose of saving the cost an arrangement that the two first studs 85 constituting the module serve as a stopper for restricting a rotary limit of the actuators 20. However, it is acceptable that the stopper is provided independent of the module.

Figure 11:
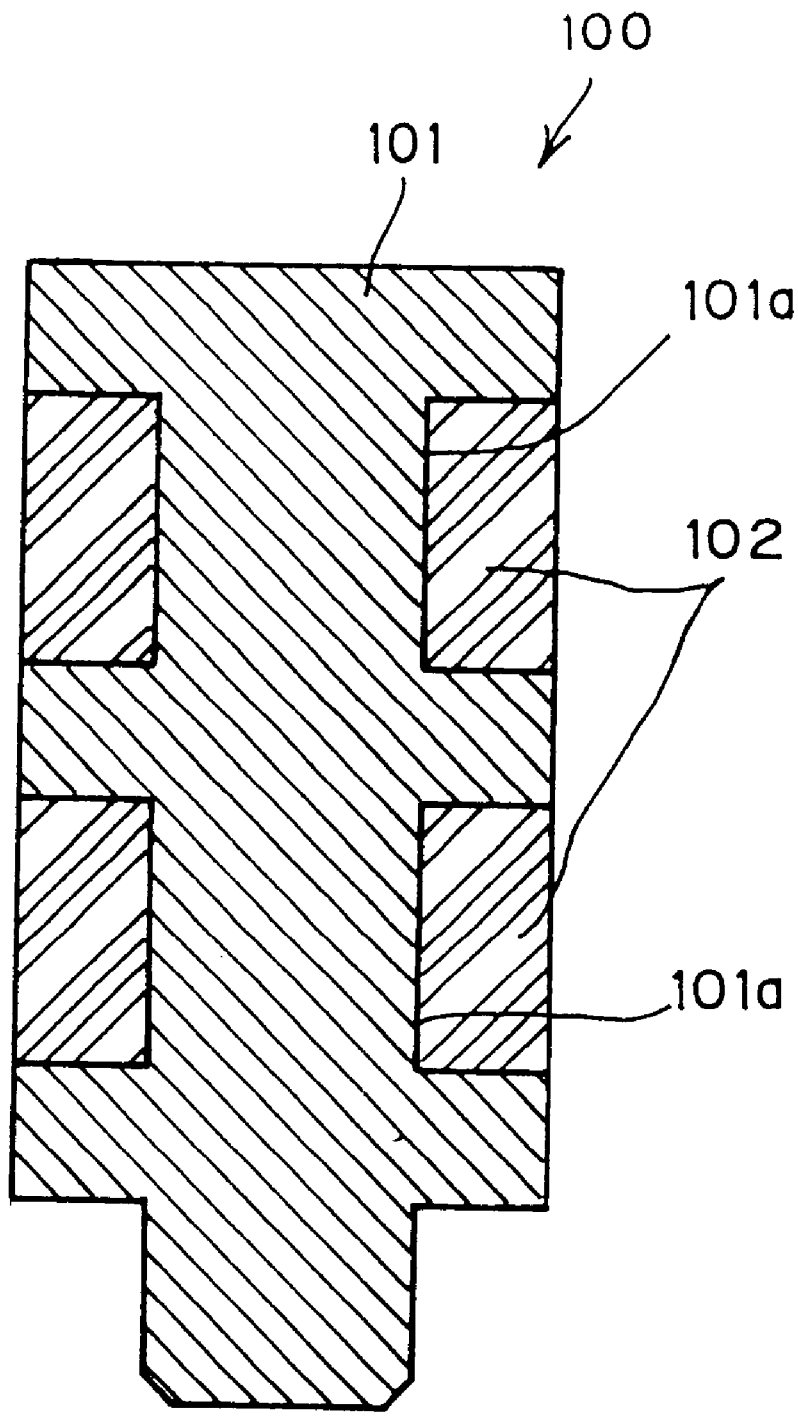
FIG. 11 is a sectional view of a stopper.

FIG. 11 is a sectional view of a structure of the stopper, as mentioned above, which is provided independent of the module.

According to a stopper 100, two grooves 101a are formed on a stopper shaft in the circumferential direction. Each of the two grooves 101a is provided with a stopper rubber 102 independently. This feature makes it possible to avoid such a situation that a deformation of one of the stopper rubbers has an effect on another rubber, and thereby improving an accuracy of a stop position of the respective two actuators.

Figure 12:
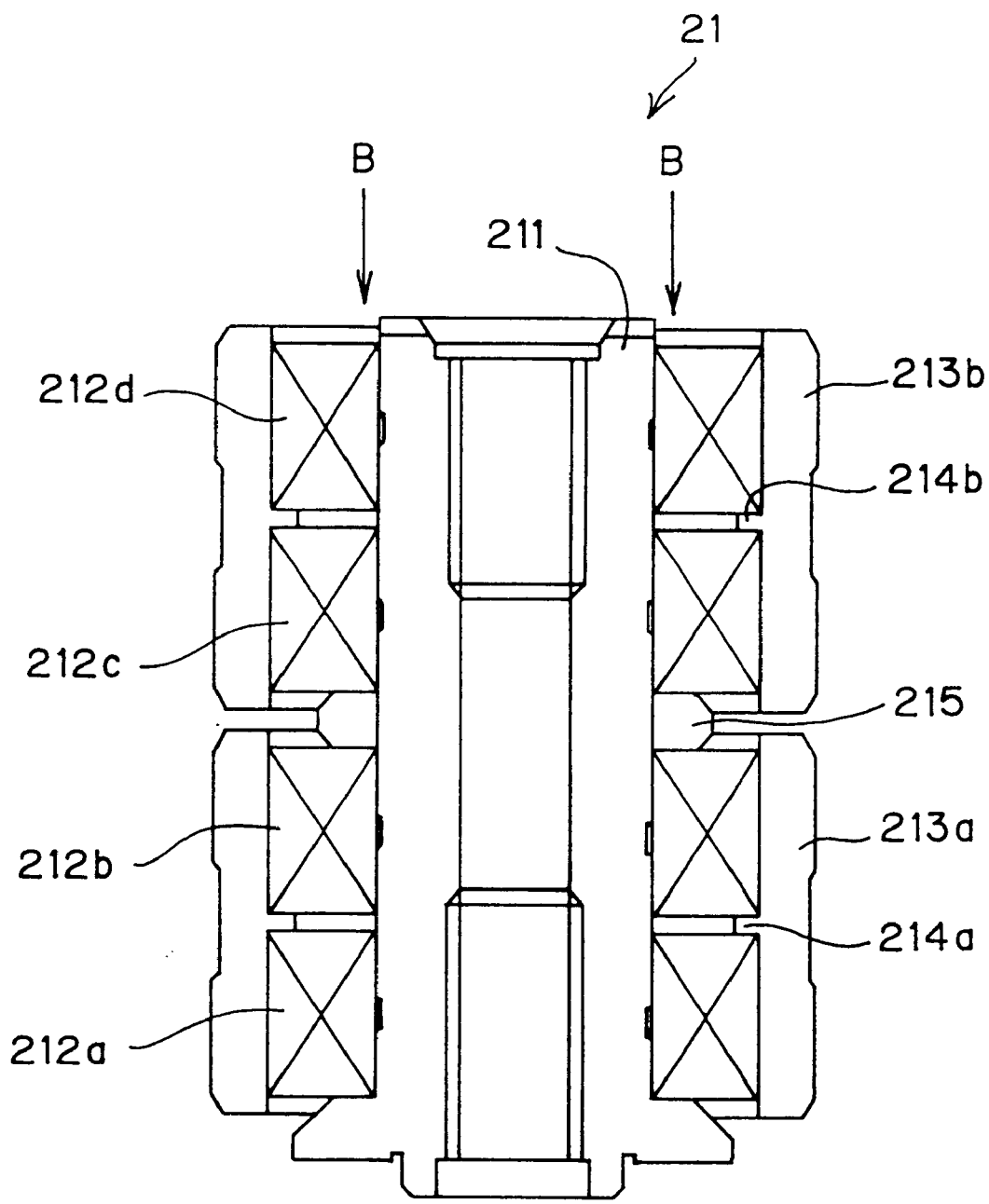
FIG. 12 is a sectional view of a rotary shaft which is used for two actuators shown in FIG. 4 on a common basis.

FIG. 12 is a sectional view of the rotary shaft 21 which is used for the two actuators 20 shown in FIG. 4 on a common basis.

The rotary shaft 21 comprises a fixing shaft 211, four bearings 212a, 212b, 212c and 212d, two sleeves 213a and 213b, and a spacer ring 215. Heights 214a and 214b, which are disposed inside the sleeves 213a and 213b, respectively, serve as a spacer, too.

Here, the height 214a of the sleeves 213a is sandwiched between the outside portions of the bearing 212a and the bearing 212b, the spacer ring 215 is sandwiched between the inside portions of the bearing 212b and the bearing 212c, which are near the fixing shaft 211, and the height 214b of the sleeves 213b is sandwiched between the outside portions of the bearing 212c and the bearing 212d, accordingly, when the inside portion of the bearing 212d, which is near the fixing shaft 211, is depressed from the top along the arrows B, the applied pressure is transmitted via the height 214b of the sleeves 213b to the subsequent bearing 212c; transmitted via the spacer ring 215 to the subsequent bearing 212b; and transmitted via the height 214a of the sleeves 213a to the subsequent bearing 212a. In this manner, the pressure is applied to all the bearings 212a–212d, so that the positions of the respective bearings 212a–212d are regulated into a state free from looseness and useless gaps. In the event that the pressure is applied and in this state the rotary shaft 21 is fixed, it is possible to assemble the bearings into the state free from looseness, and thereby avoiding a necessity for usage of for example, a countersunk spring, a coil spring, etc., which are used for the purpose of preventing looseness.

Figure 13:
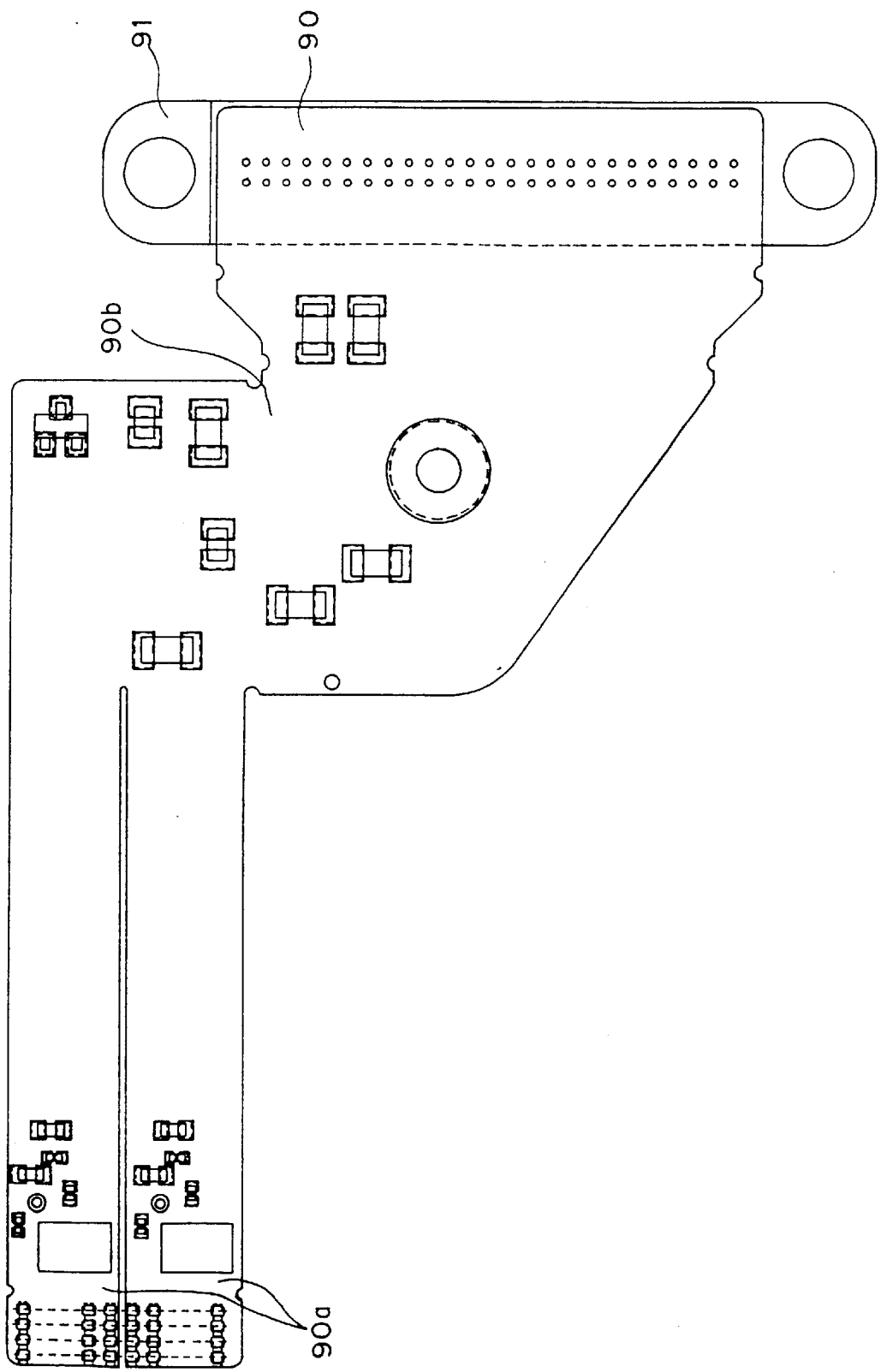
FIG. 13 is a development of a flexible substrate.

FIG. 13 is a development of the flexible substrate 90 shown in FIG. 3, too.

According to the conventional magnetic disk unit having a plurality of actuators, usually, it is needed to prepare a plurality of flexible substrates each corresponding to the associated one of the plurality of actuators. On the other hand, according to the present embodiment of the present invention, it is sufficient to prepare only one flexible substrate which is divided into two parts on only the top portions 90a so as to correspond to the two actuators. Head ICs and the like, which are used for communication of signals with the heads provided on the respective actuators, are disposed at the top portions 90a corresponding to the associated actuators, respectively, and circuit elements, which are not needed individually, are disposed at a root portion 90b near the connector 91. This arrangement contributes to saving space. Further, according to the magnetic disk unit of the present embodiment, only one flexible substrate can be used. This feature makes it possible to save the number of parts. And thus, also in this respect, the magnetic disk unit of the present embodiment contributes to saving cost and saving space.

Figure 14:
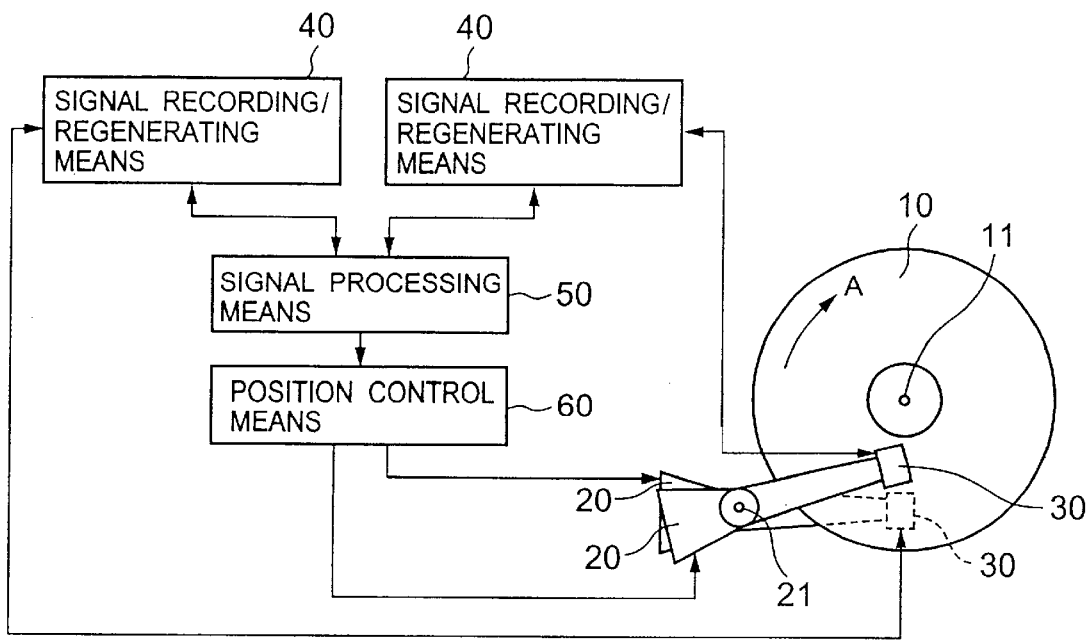
FIG. 14 is a schematic diagram of a magnetic disk unit according to a second embodiment of a storage device of the present invention.

FIG. 14 is a schematic diagram of a magnetic disk unit according to a second embodiment of a storage device of the present invention. In FIG. 14, the same parts are denoted by the same reference numbers as those of FIGS. 1 and 2. Only different points will be described and redundant description will be omitted.

Figure 2:
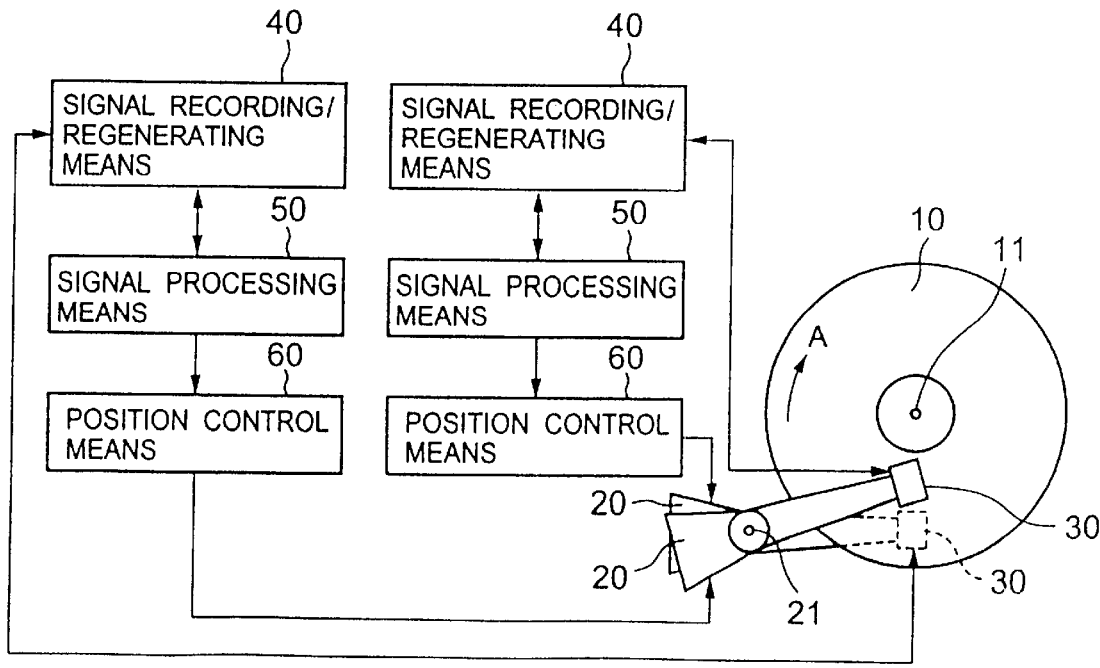
FIG. 2 is a schematic diagram of an alternative conventional magnetic disk unit.

FIG. 14 shows, similar to FIG. 2, a magnetic disk unit provided with two actuators 20 laminated having a common rotary shaft 21. Similar to FIG. 2, there are provided two signal recording/regenerating means 40 which are associated with two actuators 20, respectively. But with respect to a signal processing means 50 and a position control means 60, different from the conventional device shown in FIG. 2, only the single signal processing means 50 and position control means 60 are provided for the two actuators on a common basis.

In the magnetic disk unit, while a magnetic head is moved to a target track by an actuator (referred to a seek), data recording and regeneration by the associated actuator are not performed. Thus, according to the magnetic disk unit having a plurality of actuators, during a seek operation by some actuator, data recording and regeneration by a magnetic head loaded on another actuator can be performed. Therefore, in the event that a data processing to be allocated to each of the actuators is scheduled in such a manner that a seek time for another actuator is effectively utilized, data recording and regeneration can be performed with only a set of signal processing means. Further, in the event that a servo track is arranged on the magnetic disk in such a manner that servo signals are not simultaneously regenerated by the actuators, there is no need to perform simultaneously a position signal processing on a plurality of actuators. Consequently, it is possible to constitute a device by only a set of signal processing means and a set of position control means. In this manner, according to the present embodiment, for the magnetic disk unit having a plurality of laminated type of actuators, the signal processing means and the position control means are used on a common basis. This feature makes it possible to improve a transfer speed in accordance with a simplified circuit structure as compared with the conventional magnetic disk unit having a plurality of actuators.

Figure 15:
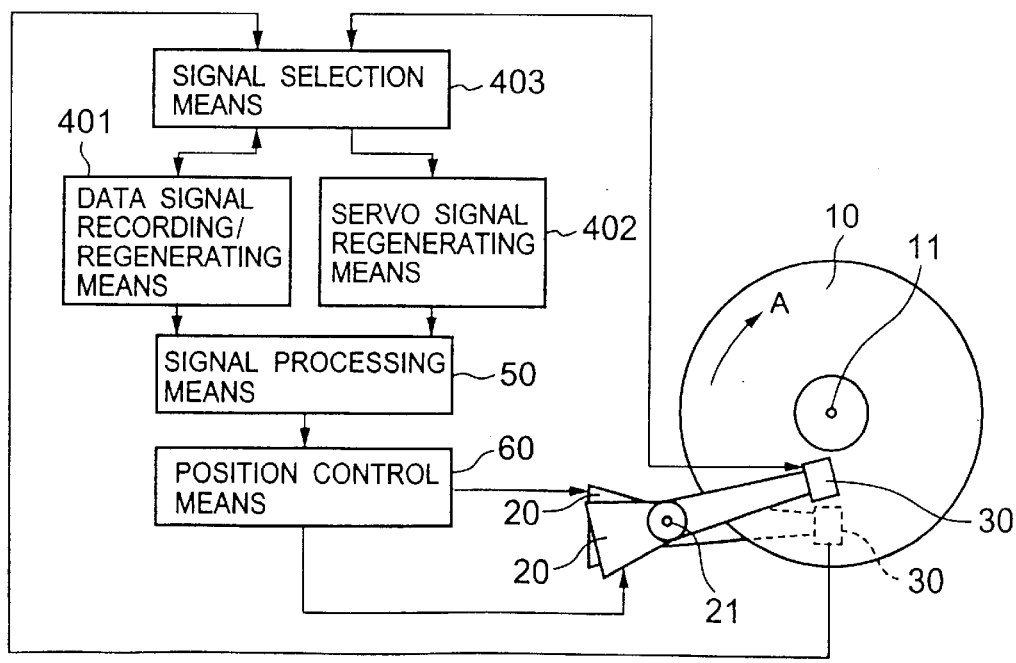
FIG. 15 is a schematic diagram of a magnetic disk unit according to a third embodiment of a storage device of the present invention.

FIG. 15 is a schematic diagram of a magnetic disk unit according to a third embodiment of a storage device of the present invention. There will be described different points from the embodiment shown in FIG. 14.

The magnetic disk unit according to the third embodiment shown in FIG. 14 is applicable to ones having three or more actuators, too. In the event that only two actuators are provided, as shown in FIG. 15, in corresponding to one signal recording/regenerating means of the second embodiment shown in FIG. 14, there are provided data signal recording/regenerating means 401 (an example of a data signal regenerating unit referred to in the present invention) for performing recording and regeneration of data signals and servo signal regenerating means 402 (an example of the servo signal regenerating unit referred to in the present invention) for performing regeneration of servo signals, and in addition signal selection means 403 (an example of a signal selection unit). The signal selection means 403 assigns the data signals and the servo signals to the data signal recording/regenerating means 401 and the servo signal regenerating means 402, respectively this feature makes it possible, as compared with the magnetic disk unit according to the second embodiment, to more simplify the magnetic disk unit according to the third embodiment, maintaining the same function.

Figure 16:
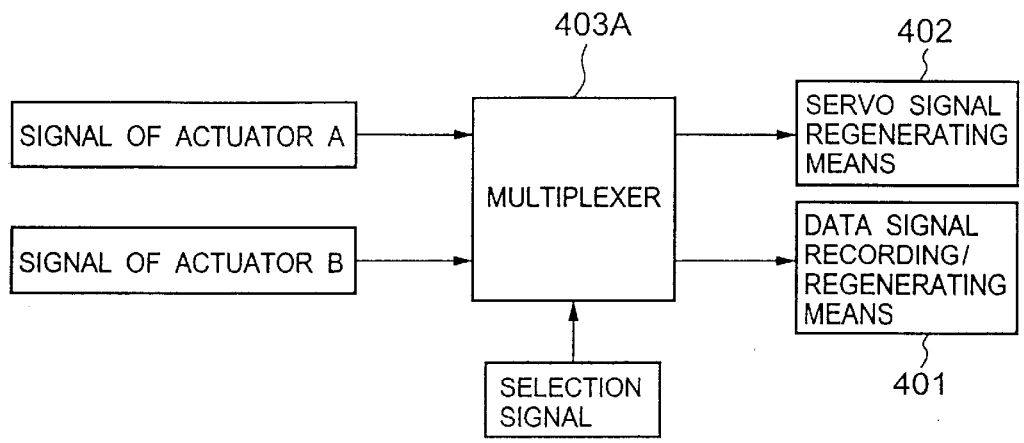
FIG. 16 is a view showing an example of signal selection means in the third embodiment shown in FIG. 15.

FIG. 16 is a view showing an example of the signal selection means 403 in the third embodiment shown in FIG. 15. Here, as an example of the selection means 403, a multiplexer 403A is used. The multiplexer 403A receives two types of signals (an actuator A signal and an actuator B signal) from two actuators, and in addition receives a selection signal according to the received input signal of the actuator A signal and the actuator B signal and also a sort of the input signal (data signal or servo signal). When the input signal is the data signal, the input signal is assigned to the data signal recording/regenerating means 401. When the input signal is the servo signal, the input signal is assigned to the servo signal regenerating means 402.

Figure 17:
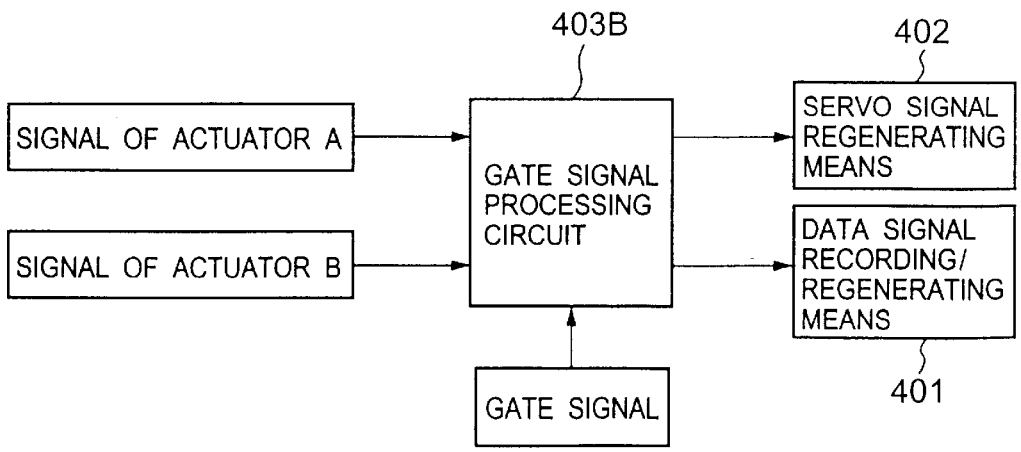
FIG. 17 is a view showing an alternative example of signal selection means in the third embodiment shown in FIG. 15.

FIG. 17 is a view showing an alternative example of the signal selection means 403 in the third embodiment shown in FIG. 15. Here, as an example of the signal selection means 403, a gate signal processing circuit 403B is used. The gate signal processing circuit 403B receives a gate signal so that the actuator A signal and the actuator B signal are assigned to the data signal recording/regenerating means 401 and the servo signal regenerating means 402 in accordance with the gate signal.

Figures 18A, 18B:
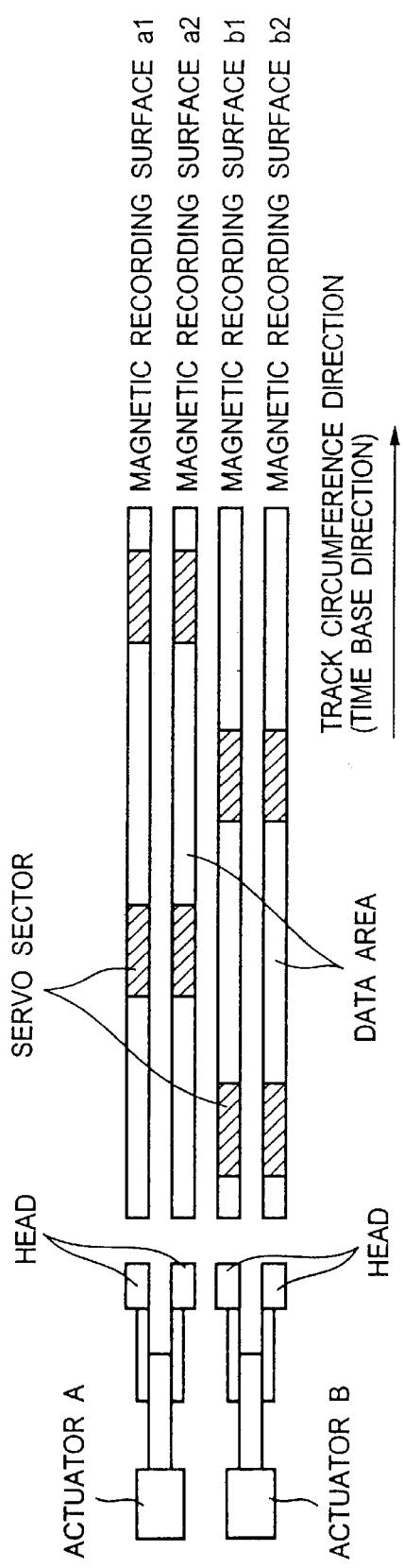
FIGS. 18(A) and (B) are typical illustrations showing a structure of an actuator and an arrangement position of servo sectors on the magnetic disk, respectively.

FIGS. 18(A) and (B) are typical illustrations showing a structure of an actuator and an arrangement position of servo sectors on the magnetic disk, respectively.

Here, two magnetic disks are superposed. FIG. 18(B) typically shows magnetic recording surfaces a1, a2, b1 and b2 of the fronts and the backs of the two magnetic disks. Two magnetic recording surfaces a1, a2 are accessed by two heads of the actuator A, respectively. Two magnetic recording surfaces b1, b2 are accessed by two heads of the actuator B, respectively. Here, the two magnetic recording surfaces a1, a2 accessed by two heads of the actuator A are different from the two magnetic recording surfaces b1, b2 accessed by two heads of the actuator B in an arrangement position for a servo sector in which servo information is recorded in a track circumferential direction (that is, a direction in which timing for an access is different). This arrangement causes timings for reading servo information by the two actuators A and B to differ from one another. As a result, it is possible to perform the position control of the two actuators A and B on a time division basis.

Figures 19A, 19B:
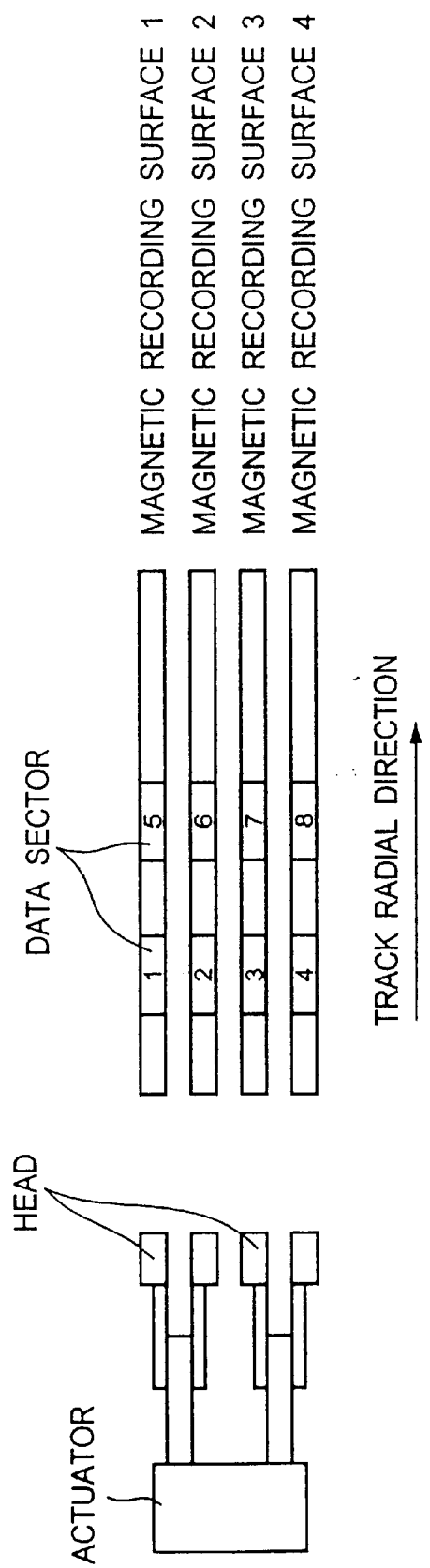
FIGS. 19(A) and (B) are typical illustrations useful for understanding an arrangement scheme (an example for a comparison) of areas (data sectors) in which data are stored on the magnetic disk.
Figures 20A, 20B:
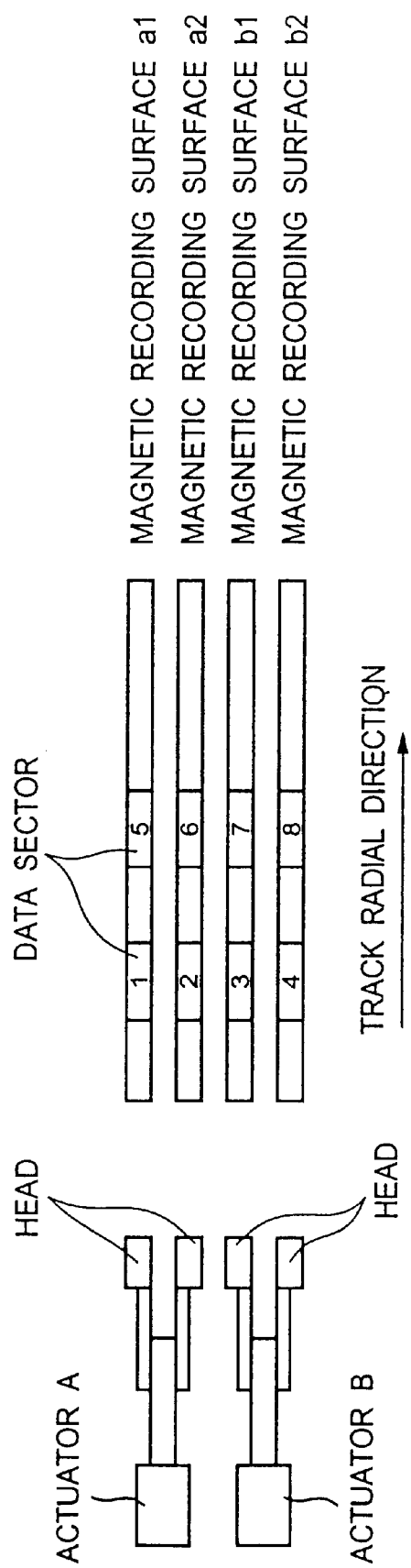
FIGS. 20(A) and (B) are typical illustrations useful for understanding an arrangement scheme (the embodiment) of areas (data sectors) in which data are stored on the magnetic disk.

FIGS. 19(A) and (B) are typical illustrations useful for understanding an arrangement scheme (an example for a comparison) of areas (data sectors) in which data are stored on the magnetic disk. FIGS. 20(A) and (B) are typical illustrations useful for understanding an arrangement scheme (the embodiment) of areas (data sectors) in which data are stored on the magnetic disk.

According to the example for a comparison shown in FIGS. 19(A) and (B), the data sectors are disposed in turn in a vertical direction within the same cylinder of the magnetic recording surfaces. On the other hand, according to the embodiment of the present invention, as shown in FIG. 20, the data sectors are alternately arranged with respect to the two magnetic recording surfaces a1, a2 accessed by two heads of the actuator A and the two magnetic recording surfaces b1, b2 accessed by two heads of the actuator B, so that the magnetic recording surfaces a1, a2 and the magnetic recording surfaces b1, b2 are alternately accessed. An access of the magnetic recording surfaces by the actuators involves useless time owing to a changeover of the heads and a changeover of the cylinders for a preparation of the successive access. In view of the foregoing, in order to simultaneously perform a data access by one head of one actuator and a preparation for the subsequent data access by another actuator, it is preferable that for example, as shown in FIG. 20(B), the data sectors are alternately arranged on the magnetic recording surfaces, or alternatively in the event that three or more actuators are provided, the data sectors are circularly arranged.

Figure 21:
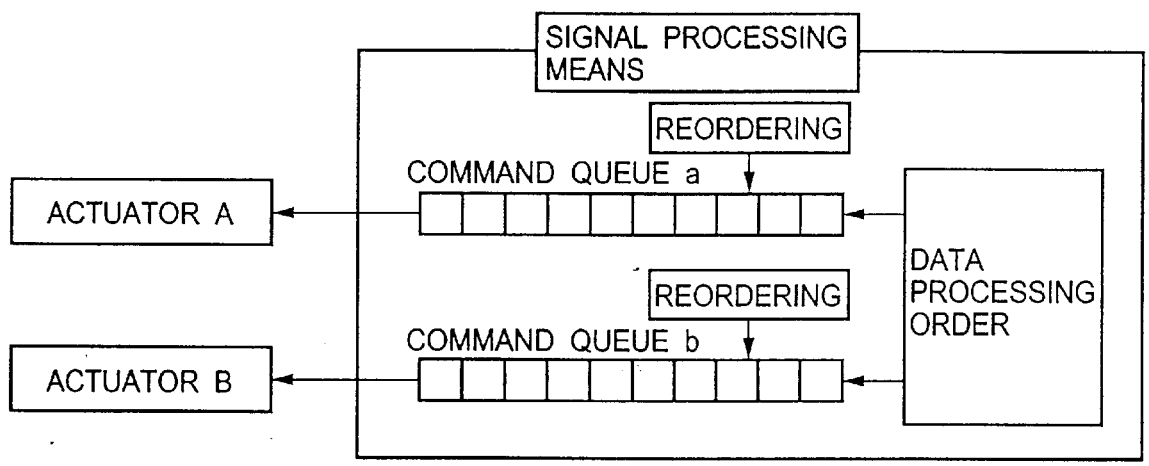
FIG. 21 is a typical illustration showing an internal structure of signal processing means into which a command queue is incorporated.

FIG. 21 is a typical illustration showing an internal structure of signal processing means into which a command queue is incorporated. Data processing orders including position control commands for two actuators are sequentially applied on a time sequence basis to the two actuators. In the event that the data processing orders are generated once and then not yet executed, as a need arises, a reordering is carried out so that a more effective access can be performed, and then the data processing orders, which are subjected to the reordering, are applied to the actuators.

According to the present embodiment, command queues for causing the data processing orders once generated to wait in order are constituted in the form of two sequences of a command queue a for the actuator A and a command queue b for the actuator B. In the command queues a and b, the reordering operations for the data processing orders for the actuators A and B are performed, respectively. This arrangement makes it possible to perform more effectively perform a reordering of the data processing commands and a transmission of the commands to the respective actuators A and B, as compared with a case where only one command queue is prepared so that data processing commands for a plurality of actuators are placed in order in the one command queue.

Incidentally, while the present embodiments mentioned above relate to a magnetic disk unit, the present invention is not restricted to the magnetic disk unit, but applicable to various types of apparatuses or units, such as an optical disk unit, a photomagnetic disk unit, etc. Further, the present invention is applicable not only to a storage device having a recording medium capable of reading and writing, but also to a storage device having a recording medium for a read-only. Furthermore, the present invention is applicable not only to a storage device in which a recording medium is incorporated on a fixing basis, but also to a storage device capable of accessing a recording medium which is detachably loaded.

As mentioned above, according to the present invention, it is possible to contribute to a miniaturization and a low cost of a storage device in which a plurality of actuators are adopted to improve an access speed.

While the present invention has been described with reference to the particular illustrative embodiments, it is not to be restricted by those embodiments but only by the appended claims. It is to be appreciated that those skilled in the art can change or modify the embodiments without departing from the scope and sprit of the present invention.

What is claimed is:

1. A storage device comprising:
   a rotation driving unit for rotating a disk type of storage medium loaded on a center shaft;
   two actuators each having a head for picking up information from the storage medium, each of said two actuators rotating on a common rotary shaft and moving the associated head along the storage medium in a radial direction of the storage medium; and
   a voice coil motor for rotating said two actuators on the rotary shaft,
   wherein said voice coil motor comprises:
      a first magnet provided for said two actuators on a common basis; and
      two coils provided for said two actuators, respectively, and
      wherein said voice coil motor rotates said two actuators on the common rotary shaft independently of one another.

2. A storage device according to claim 1, wherein said storage device further comprises:
   two yokes, which are associated with said two actuators, respectively, said two yokes being disposed at both sides between which said first magnet intervenes.

3. A storage device according to claim 1, wherein said two coils are disposed at both sides between which said first magnet intervenes.

4. A storage device according to claim 1, wherein said rotation driving unit rotates a plurality of disk type of storage media each loaded on a coaxial basis on the center shaft, and as the plurality of disk type of storage media, an odd number of pieces of storage media each storing information on both front and back is loaded, and as said two actuators, an even number of pieces of heads for picking up information stored in both surfaces of front and back of the storage medium on a sharing basis for each surface is disposed on said two actuators in such a manner that said even number of pieces of heads are divided into two equal parts on said two actuators.

5. A storage device according to claim 1, wherein said voice coil motor has two second magnets disposed at positions adjacent to said two yokes between the respective said two yokes and said first magnet, respectively.

6. A storage device according to claim 1, wherein said storage device further comprises a stopper for limiting a rotary range of said two actuators.

7. A storage device according to claim 6, wherein said stopper is formed together with said first magnet and said two yokes into a module in one united body.

8. A storage device according to claim 1, wherein said storage device further comprises a flexible substrate for transmitting signals picked up by the heads of said two actuators, said flexible substrate being common to all the heads.

* * * * *

UNITED STATES PATENT AND TRADEMARK OFFICE
CERTIFICATE OF CORRECTION

PATENT NO. : 6,690,549 B1
DATED : February 10, 2004
INVENTOR(S) : Sukagawa et al.

It is certified that error appears in the above-identified patent and that said Letters Patent is hereby corrected as shown below:

Title page,
Item [75], Inventors, delete "Koichi Aikawa, Tatsuro Sasamoto, Susumu Yoshida, and Akihide Jinzenji."

Signed and Sealed this

Fifteenth Day of February, 2005

JON W. DUDAS
*Director of the United States Patent and Trademark Office*